United States Patent
Oh et al.

(10) Patent No.: US 9,499,055 B2
(45) Date of Patent: Nov. 22, 2016

(54) INVERTER FOR ELECTRIC VEHICLE

(71) Applicant: LSIS CO., LTD., Anyang-si, Gyeonggi-do (KR)

(72) Inventors: Sung Jun Oh, Cheonan-si (KR); Chang Min Jung, Cheonan-si (KR); Beum Jun Kim, Seoul (KR); Ung Hoe Kim, Incheon (KR); Ki Young Moon, Cheonan-si (KR)

(73) Assignee: LSIS CO., LTD., Anyang-si (KR)

( * ) Notice: Subject to any disclaimer, the term of this patent is extended or adjusted under 35 U.S.C. 154(b) by 27 days.

(21) Appl. No.: 14/550,771

(22) Filed: Nov. 21, 2014

(65) Prior Publication Data

US 2015/0151695 A1   Jun. 4, 2015

(30) Foreign Application Priority Data

Dec. 4, 2013   (KR) .................. 10-2013-0150236

(51) Int. Cl.
 *B60L 11/00*   (2006.01)
 *B60L 15/00*   (2006.01)

(52) U.S. Cl.
 CPC .............. *B60L 11/00* (2013.01); *B60L 15/007* (2013.01); *Y02T 10/645* (2013.01)

(58) Field of Classification Search
 CPC .. B60L 11/00; B60L 15/007; Y02T 10/7241; B60R 16/03; G01R 15/18; G01R 19/0092; G01R 15/202; G01R 33/02
 See application file for complete search history.

(56) References Cited

U.S. PATENT DOCUMENTS

| | | | |
|---|---|---|---|
| 9,260,020 B2* | 2/2016 | Ishii | H02M 7/003 |
| 2011/0058391 A1* | 3/2011 | Ueno | H02M 7/003 363/13 |
| 2013/0294040 A1* | 11/2013 | Fukumasu | H02M 1/44 361/752 |
| 2014/0002054 A1* | 1/2014 | Higashikawa | G01R 1/04 324/76.11 |
| 2014/0092663 A1* | 4/2014 | Shimizu | H02M 7/003 363/141 |
| 2014/0152092 A1* | 6/2014 | Lopez de Arroyabe | B60L 15/007 307/10.1 |

FOREIGN PATENT DOCUMENTS

| | | |
|---|---|---|
| CN | 102176346 | 9/2011 |
| JP | 9-127159 | 5/1997 |
| JP | 2009-210405 | 9/2009 |
| WO | 2013/031291 | 3/2013 |

\* cited by examiner

*Primary Examiner* — Zachary M Pape
(74) *Attorney, Agent, or Firm* — Lee Hong Degerman Kang & Waimey

(57) ABSTRACT

An inverter for an electric vehicle is provided. The inverter for an electric vehicle, which controls an RPM of a motor for the electric vehicle, the inverter including a busbar connected to a power semiconductor module for supplying current, a current sensor measuring the current passing through the busbar, and a control board on which the current sensor is mounted, the control board controlling the motor for the electric vehicle according to a result measured by the current sensor. The busbar is disposed to vertically pass through the current sensor and control board.

3 Claims, 6 Drawing Sheets

INVERTER FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2013-0150236, filed on Dec. 4, 2013, the contents of which are hereby incorporated by reference herein in its entirety.

BACKGROUND

The present disclosure relates to an inverter for an electric vehicle.

In recent years, technologies in regard to electrical vehicles traveling by using electricity that is green energy are being rapidly developed. Electric vehicles represent vehicles driven by using electricity. Electric vehicles may be largely classified into battery powered electric vehicles and hybrid electric vehicles. Here, the battery powered electric vehicles represent vehicles driven by using only electricity and thus are generally called electric vehicles. Also, the hybrid electric vehicles represent vehicles driven by using electricity and fossil fuels.

Most of electric vehicles include a motor generating a rotation force, a battery supplying power into the motor, an inverter controlling an RPM of the motor, a battery charger charging the battery with electricity, and a low voltage DC/DC converter for electric vehicles.

Among these, the inverter includes a sensor for sensing current to precisely control the motor.

FIG. 1 is a view of an inverter for an electric vehicle according to the related art.

Referring to FIG. 1, the electric vehicle according to the related art includes a hole-type current sensor 10. The current sensor 10 is fitted into a busbar 40 and then mounted on a CT terminal block 60.

According to the inverter for the electric vehicle, current generated from a power semiconductor module 30 is transmitted to the outside through the busbar 40. Here, the current sensor 10 surrounding the busbar 40 measures the current flowing in the busbar 40 to transfer the measured current to a printed circuit board (PCB) 20 through a wire harness 50.

Here, the CT terminal block 60, which is a separate fixing unit, is installed to fix the busbar 40. The current sensor 10 is fitted into a plate-shaped portion of the busbar 40, and then the current sensor 10 and the busbar 40 are assembled with the CT terminal block 60.

Thus, a separate wire harness 50 is needed to transmit the current from the current sensor 10 to the PCB 20.

In this structure in which the busbar 40 is disposed at a side of the power semiconductor module 30, the CT terminal block 60 is needed to fix the busbar 40. Thus, the inverter increases in volume and manufacturing cost.

Also, since the busbar 40 have a small section-area to pass through the current sensor 10, a material of the busbar 40 is limited to copper (Cu). Thus, it is difficult to reduce manufacturing costs of the inverter.

SUMMARY

Embodiments provide an inverter for an electric vehicle, in which a CT terminal block is removed to reduce a volume and manufacturing costs.

In one embodiment, an inverter for an electric vehicle, which controls an RPM of a motor for the electric vehicle, the inverter including: a busbar connected to a power semiconductor module for supplying current; a current sensor measuring the current passing through the busbar; and a control board on which the current sensor is mounted, the control board controlling the motor for the electric vehicle according to a result measured by the current sensor, wherein the busbar is disposed to vertically pass through the current sensor and control board.

The busbar may include: a main body having a cylindrical shape; and a fixing part disposed on a lower end of the main body to protrude outward from the main body, wherein the busbar may be coupled to the power semiconductor module through the fixing part.

The busbar may be disposed on an upper portion of the power semiconductor module to overlap the power semiconductor module when viewed from above.

The current sensor may have a through hole through which the busbar vertically passes.

The current sensor may be coupled to a bottom surface of the control board by soldering.

The current sensor may include a signal terminal and fixing terminal that are connected to the control board, and wherein the signal and fixing terminals may be coupled to the control board by soldering.

The busbar may be formed of an aluminum material.

The details of one or more embodiments are set forth in the accompanying drawings and the description below. Other features will be apparent from the description and drawings, and from the claims.

DETAILED DESCRIPTION OF THE EMBODIMENTS

Figure 1:
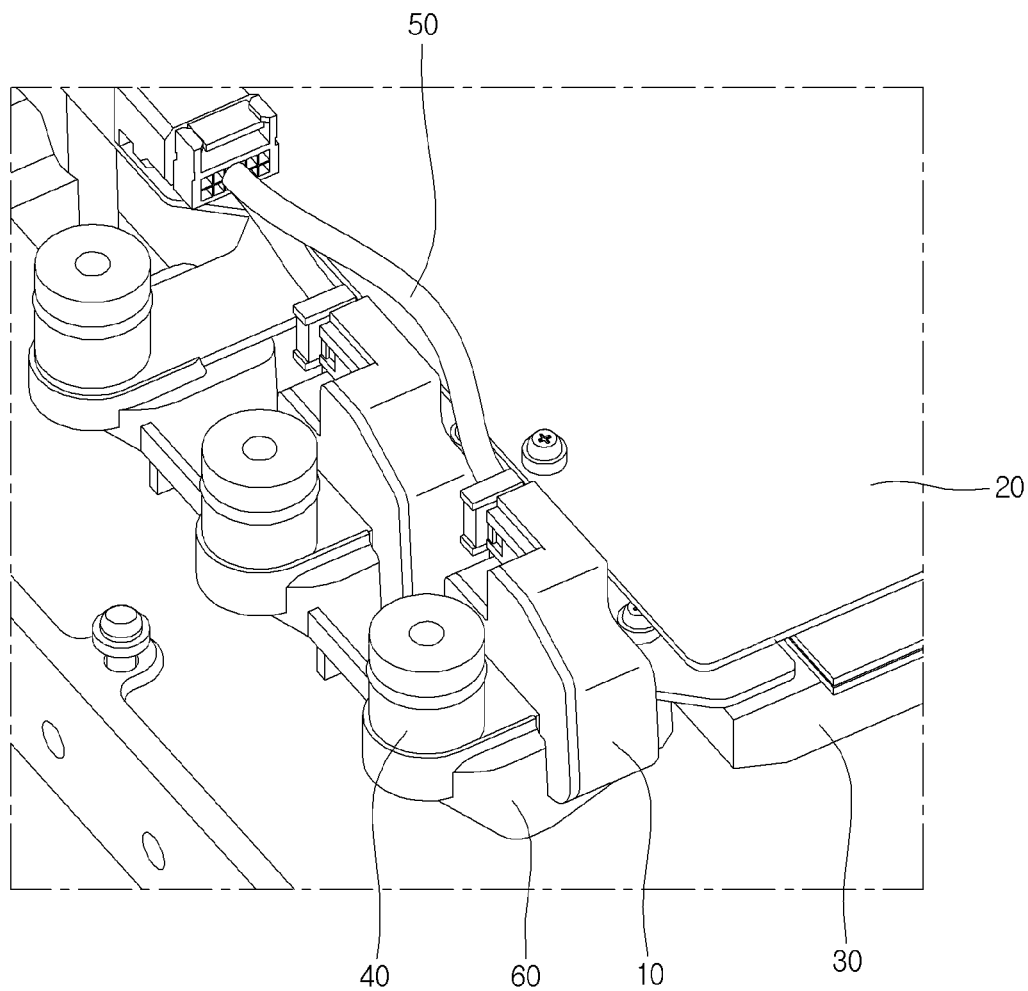
FIG. 1 is a view illustrating a portion of an inverter for an electric vehicle according to a related art.
Figure 2:
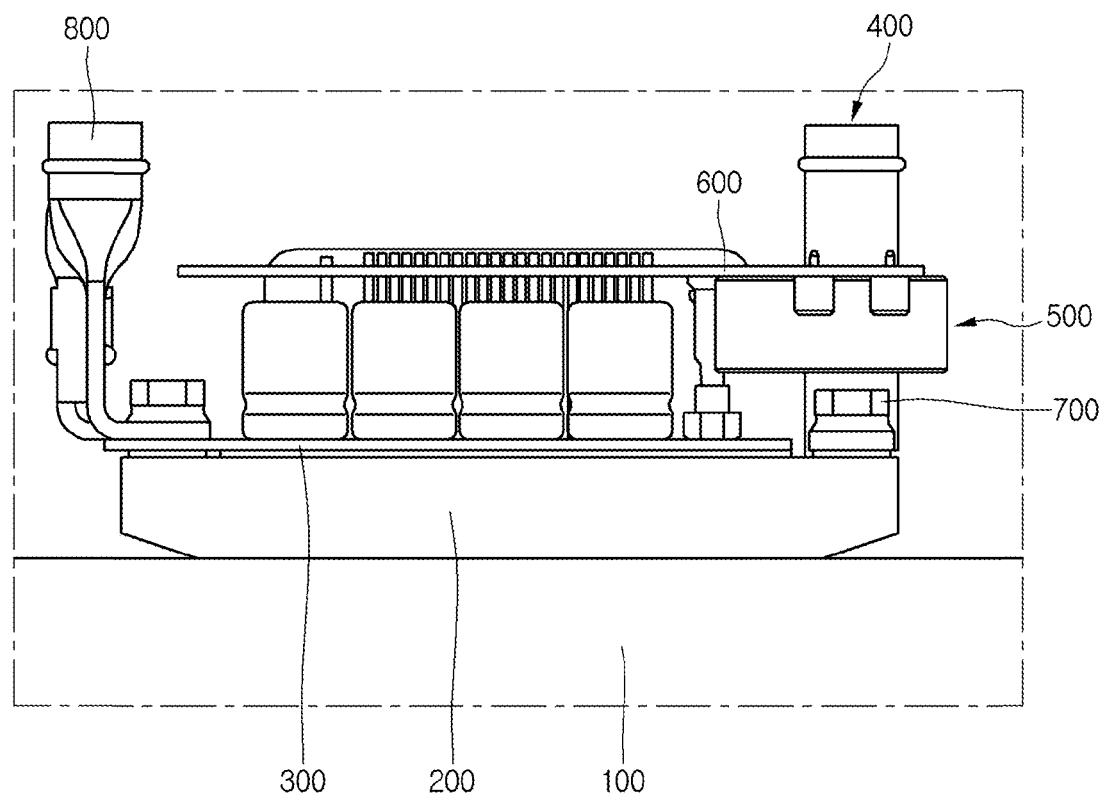
FIG. 2 is a side view illustrating a portion of an inverter for an electric vehicle according to an embodiment.
Figure 3:
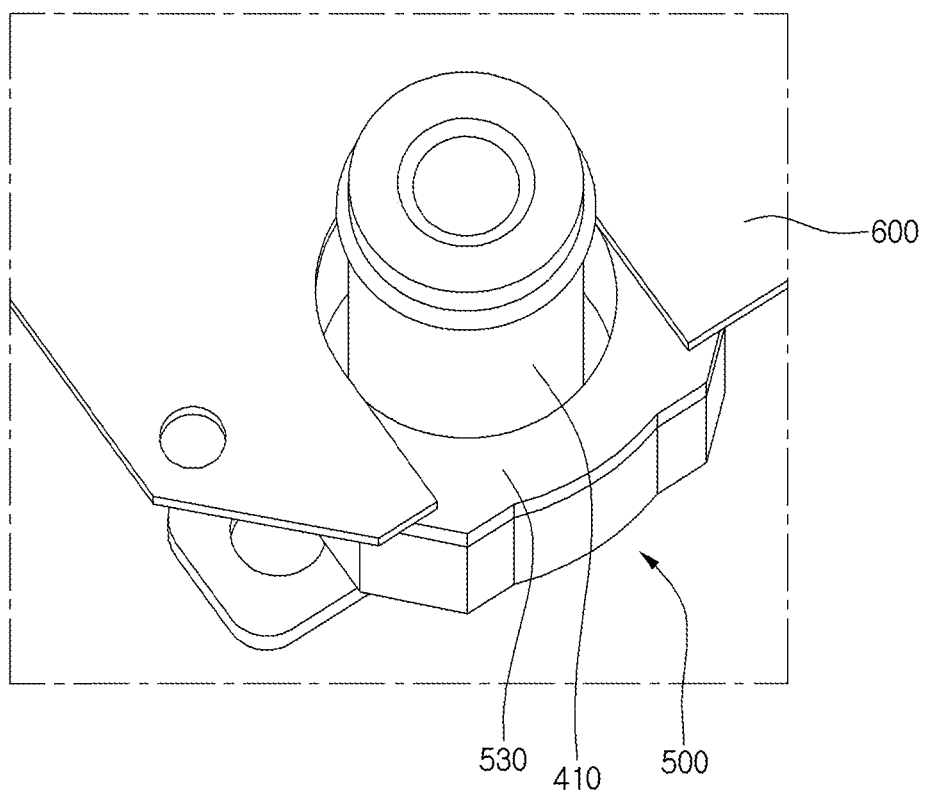
FIG. 3 is a perspective view illustrating a portion of the inverter for the electric vehicle according to an embodiment.
Figure 4:
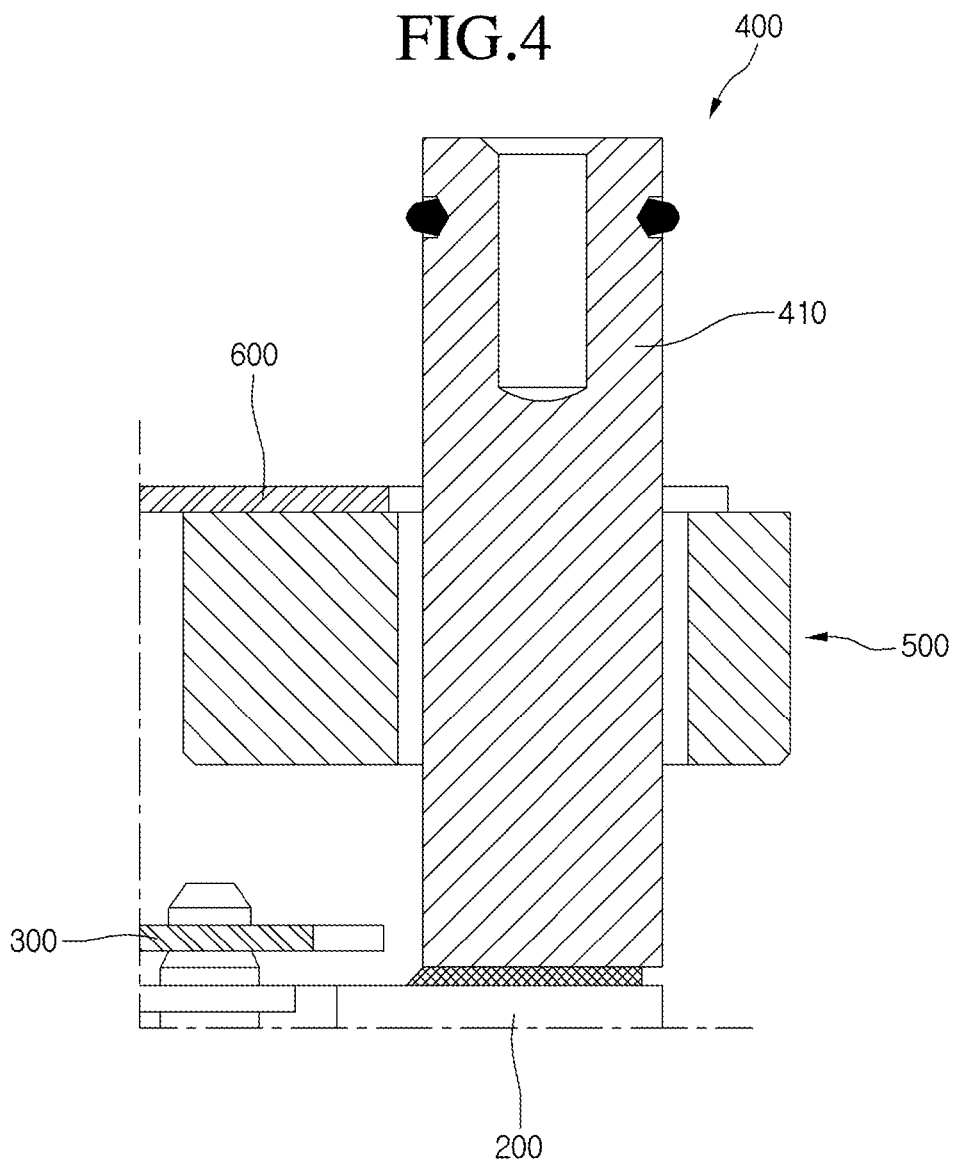
FIG. 4 is a side view illustrating a portion of the inverter for the electric vehicle according to an embodiment.
Figure 5:
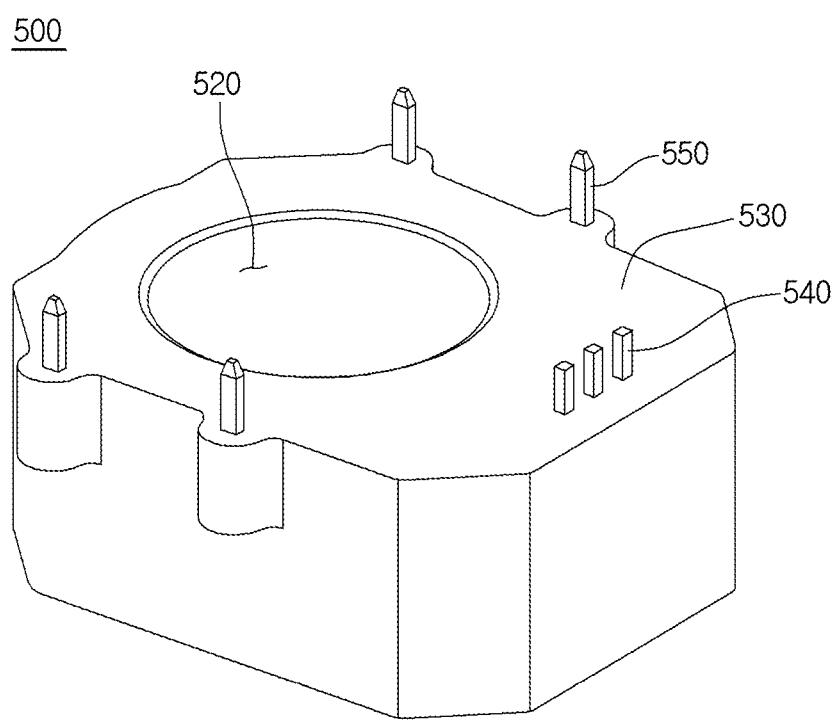
FIG. 5 is a view of a current sensor.
Figure 6:
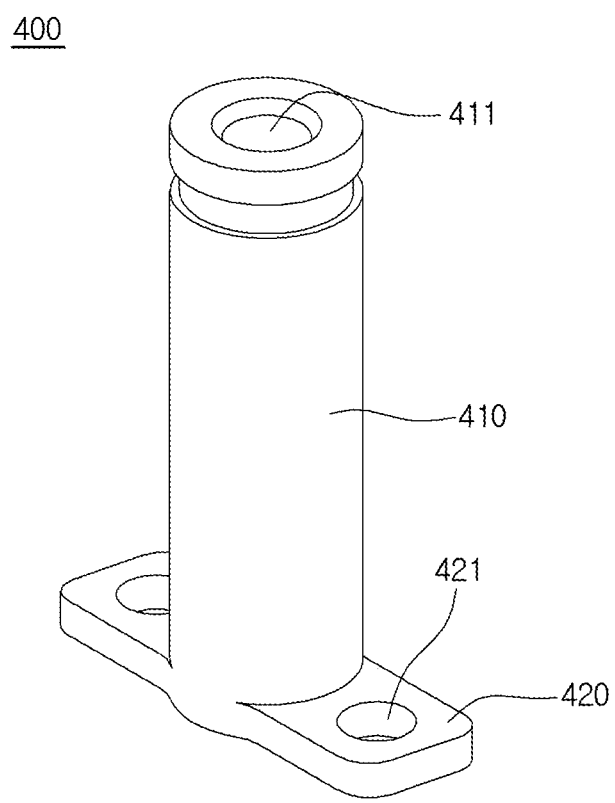
FIG. 6 is a view of a busbar.

Hereinafter, an inverter for an electric vehicle according to an embodiment will be described with reference to the accompanying drawings.

An electric vehicle inverter according to an embodiment includes a heatsink 100, a power semiconductor module 200 coupled to an upper portion of the heatsink 100, a driving board 300 connected to the power semiconductor module 200, a busbar 400 having one end connected to the driving board 300, a current sensor 500 disposed at the outside of the busbar 400, and a control board 600 connected to the current sensor 500.

The heatsink 100 may exhaust heat generated from the power semiconductor module 200 and be formed of a material having excellent thermal conductivity.

The power semiconductor module 200 may include transistors of which an on/off operation is controlled by an external signal, diodes having rectifying property, and other devices. Here, a common transistor may include a metal-oxide semiconductor field-effect-transistor (MOSFET) and an insulated gate bipolar transistor (IGBT). The power semiconductor module 200 is fixed to the upper portion of the heatsink 100. A bottom surface of the power semiconductor module 200 may be in surface-contact with a top surface of the heatsink 100.

The driving board 300 includes a driving printed circuit board (PCB) and a semiconductor device mounted on the driving PCB. The driving board 300 controls driving of the inverter. The driving board 300 is fixed to the upper portion of the power semiconductor module 200.

The busbar 400 is formed of a conduct material and coupled to the upper portion of the power semiconductor module 200. In detail, the busbar 400 is coupled to an area at the outside of a portion where the driving board 300 is disposed on the upper portion of the power semiconductor module 200.

The busbar 400 includes a cylindrical part 410 having an approximately cylindrical shape and a fixing part 420 extending outward from the cylindrical part 410.

The cylindrical part 410 may lengthily extend in a vertical direction. A bolt insertion part 411 may be defined by cutting a portion of an upper end of the cylindrical part 410 so that a bolt is coupled to the upper end of the cylindrical part 410.

The fixing part 420 includes a coupling hole 421 vertically passing therethrough. A bolt 700 may pass through the coupling hole 421. The bolt 700 may fix the fixing part 420 to the power semiconductor module 200.

Thus, the busbar 400 having the above-described structure may be firmly fixed to the upper portion of the power semiconductor module 200 by the bolt 700 passing through a vertical through hole 431 defined in the fixing part 420 of the power semiconductor module 200.

Here, the cylindrical part 410 of the busbar 400 may be disposed vertically directly above the power semiconductor module 200. In detail, the cylindrical part 410 may have an upper end that is disposed vertically directly above the power semiconductor module 200. Thus, when viewed from above, the busbar 400 may overlap the power semiconductor module 200. That is, when viewed from above, the busbar 400 is disposed inside an outer boundary of the power semiconductor module 200.

For reference, the busbar 400 may connect the power semiconductor module 200 to a motor (not shown) of the electric vehicle to allow a current to flow between the semiconductor module 200 and the motor. Thus, the upper end of the busbar 400 may be connected to the motor and a lower end of the busbar 400 may be connected to the power semiconductor module 200.

The busbar 400 may be formed of an aluminum material. Thus, the inverter of the present disclosure may be reduced in manufacturing costs.

The current sensor 500 measures the current flowing in the busbar 400 and has a through hole 520 vertically defined in a central portion thereof. The current sensor 500 may sense the current flowing through the busbar 400 passing through the through hole 520. Also, the current sensor 500 may transmit the sensed information to the control board 600 that will be described later.

The current sensor 500 may further include a facing surface 530 that is facing the control board 600, and signal and fixing terminals 540 and 550 protruding from the facing surface 530 toward the control board 600. The facing surface 530 may face upward.

The signal terminal 540 and the fixing terminal 550 may protrude from the facing surface 530. Alternatively, the signal terminal 540 and the fixing terminal 550 may protrude from a side surface of the current sensor 500, which is disposed at a lateral side of the facing surface 530.

The signal terminal 540 is a portion for transmitting a signal by being connected to the control board 600. The signal terminal 540 may be coupled to the control board 600 by soldering. A current value sensed by the current sensor 500 is transmitted to a control PCB through the signal terminal 540.

The fixing terminal 550 is a portion that is soldered to firmly fix the control board 600 and the current sensor 500 to each other. The fixing terminal 550 may have a thickness greater than that of the signal terminal 540.

The control board 600 includes the control PCB and a semiconductor device mounted on the control PCB. The control board 600 controls the motor. The current sensor 500 is coupled to a lower portion of the control board 600.

Reference numeral 800 represents another busbar. The busbar 800 may connect the power semiconductor module 200 to the battery (not shown).

Since the electric vehicle inverter according to an embodiment has the above-described structure, it is unnecessary to use the CT terminal block. In the structure of the typical inverter in which the busbar 40 is disposed at the side of the power semiconductor module 30, the driving board, and the control board, other member does not exist between the busbar 40 and the heatsink, and thus the CT terminal block is required so as to completely insulate between the busbar 40 and the heatsink. However, according to an embodiment, since the busbar 400 is disposed at the inside of the power semiconductor module 200 and control board 600, it is unnecessary to insulate between the busbar 400 and the heatsink 100 and to use the CT terminal block.

Also, since the CT terminal block is removed, the inverter may be reduced in volume.

Also, since the busbar 400 has a section area wider than that of related art to pass through the current sensor 500, the busbar 400 may be formed of other metal materials such as aluminum (Al), instead of copper (Cu). Thus, the inverter may be reduced in manufacturing costs and in weight to improve fuel-efficiency.

According to the present disclosure, the CT terminal block may be removed to reduce the volume of the inverter and manufacturing costs.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An inverter for an electric vehicle, which controls an RPM of a motor for the electric vehicle, the inverter comprising:
    a busbar connected to a power semiconductor module for supplying current;
    a current sensor measuring the current passing through the busbar; and
    a control board on which the current sensor is mounted, the control board controlling the motor for the electric vehicle according to a result measured by the current sensor,
    wherein the busbar is disposed to vertically pass through the current sensor and control board, and is disposed on an upper portion of the power semiconductor module to overlap the power semiconductor module when viewed from above, wherein the current sensor include a through hole through which the busbar vertically passes, a facing surface facing a lower surface of the control board, signal terminals protruding upward from the facing surface in a row, and fixing terminals protruding upward from a circumference of the facing surface at regular intervals and have a thickness greater than that of the signal terminals, wherein the current sensor is directly coupled to the lower surface of the control board by soldering of the signal terminals and the fixing terminals to the control board.

2. The inverter according to claim 1, wherein the busbar comprises:

a main body having a cylindrical shape; and a fixing part disposed on a lower end of the main body to protrude outward from the main body, wherein the busbar is coupled to the power semiconductor module through the fixing part.

3. The inverter according to claim 1, wherein the busbar is formed of an aluminum material.

* * * * *